United States Patent
Seyed Jamali et al.

(10) Patent No.: US 10,752,797 B2
(45) Date of Patent: Aug. 25, 2020

(54) CONDUCTIVE INK COMPOSITIONS AND METHODS FOR PREPARATION OF STABILIZED METAL-CONTAINING NANOPARTICLES

(71) Applicant: XEROX CORPORATION, Norwalk, CT (US)

(72) Inventors: Hojjat Seyed Jamali, Mississauga (CA); Adela Goredema, Ancaster (CA); Naveen Chopra, Oakville (CA); Jonathan Lee, Oakville (CA); Barkev Keoshkerian, Thornhill (CA)

(73) Assignee: XEROX CORPORATION, Norwalk, CT (US)

( * ) Notice: Subject to any disclaimer, the term of this patent is extended or adjusted under 35 U.S.C. 154(b) by 10 days.

(21) Appl. No.: 16/043,660

(22) Filed: Jul. 24, 2018

(65) Prior Publication Data

US 2020/0032092 A1  Jan. 30, 2020

(51) Int. Cl.
| | |
|---|---|
| *C09D 11/52* | (2014.01) |
| *B22F 1/00* | (2006.01) |
| *B22F 9/24* | (2006.01) |
| *B82Y 40/00* | (2011.01) |
| *B82Y 30/00* | (2011.01) |

(52) U.S. Cl.
CPC ............ *C09D 11/52* (2013.01); *B22F 1/0018* (2013.01); *B22F 1/0074* (2013.01); *B22F 9/24* (2013.01); *B22F 2301/255* (2013.01); *B22F 2998/10* (2013.01); *B22F 2999/00* (2013.01); *B82Y 30/00* (2013.01); *B82Y 40/00* (2013.01)

(58) Field of Classification Search
CPC .......... C09D 11/52; B22F 9/24; B22F 1/0018; C22C 5/06
USPC .................. 252/511, 514; 427/98.4
See application file for complete search history.

(56) References Cited

U.S. PATENT DOCUMENTS

| | | | |
|---|---|---|---|
| 7,270,694 B2 | 9/2007 | Li et al. | |
| 7,494,608 B2 | 2/2009 | Li et al. | |
| 9,422,443 B2 * | 8/2016 | Iguchi | B22F 9/24 |
| 9,725,614 B2 | 8/2017 | Liu et al. | |
| 9,776,250 B2 * | 10/2017 | Iguchi | B22F 1/0018 |
| 2009/0214764 A1 * | 8/2009 | Li | B22F 1/0018 427/98.4 |
| 2013/0334470 A1 * | 12/2013 | Kurihara | C22C 5/06 252/514 |
| 2014/0312284 A1 | 10/2014 | Liu et al. | |
| 2016/0326337 A1 | 11/2016 | Farrugia et al. | |
| 2017/0240758 A1 | 8/2017 | Liu et al. | |
| 2017/0253757 A1 | 9/2017 | Salami et al. | |
| 2017/0298246 A1 | 10/2017 | Liu et al. | |

OTHER PUBLICATIONS

Author Unknown, "1-Phenyl-1-cyclohexene 95%," Sigma-Alrich, https://www.sigmaaldrich.com/catalog/product/aldrich/p22303?lang=en&region=US, downloaded Feb. 20, 2018, 3 pgs.
Author Unknown, "Phenylcyclohexane≥97%," Sigma-Alrich, https://www.sigmaaldrich.com/catalog/product/aldrich/c104809?lang=en&region=US&cm . . . , downloaded Feb. 20, 2018, 3 pgs.
Author Unknown, "Xerox Silver Nanoparticle Piezo Inkjet Ink Product Code: xcm-nsIJ," product information sheet 2015, 1 pg.
Author Unknown, "Xerox Silver Nanoparticle Flexographic Ink Product Code: xcm-nxFLX," product information sheet, 2015,1 pg.
Author Unknown, "Xerox Silver Nanoparticle Pneumatic Aerosol Jet Ink Product Code: xcm-nsPA," product information sheet, 2015, 1 pg.
Author Unknown, "Xerox Silver Nanoparticle Ultrasonic Aerosol Jet Ink Product Code: xcm-nsUA," product information sheet, 2015, 1 pg.
Author Unknown, "Silver Nanoparticle & Silver Ink," Xerox Research Centre of Canada, products information sheet, http://xrcc.external.xerox.com/electronic-materials.html, downloaded Mar. 2, 2018, 3 pgs.

* cited by examiner

*Primary Examiner* — Khanh T Nguyen
(74) *Attorney, Agent, or Firm* — MH2 Technology Law Group LLP

(57) ABSTRACT

A nanoparticle composition comprising a plurality of stabilized metal-containing nanoparticles comprising silver and/or a silver alloy composite. The stabilized metal-containing nanoparticles are prepared by a method comprising reacting a silver compound with a reducing agent comprising a hydrazine compound by incrementally adding the silver compound to a first mixture comprising the reducing agent, a stabilizer and a solvent. The stabilizer comprises a mixture of a first organoamine and a second organoamine, an alkyl moiety of the first organoamine having a longer carbon chain length than the alkyl moiety of the second organoamine. The first organoamine is selected from the group consisting of decylamine, undecylamine, dodecylamine, tridecylamine, tetradecylamine and mixtures thereof. The second organoamine is selected from group consisting of butylamine, pentylamine, hexylamine, heptylamine, octylamine, nonylamine, decylamine and mixtures thereof.

13 Claims, No Drawings

CONDUCTIVE INK COMPOSITIONS AND METHODS FOR PREPARATION OF STABILIZED METAL-CONTAINING NANOPARTICLES

BACKGROUND

Embodiments herein relate generally to methods of preparing stabilized metal-containing nanoparticles and conductive ink compositions containing stabilized metal-containing nanoparticles prepared by such methods. Certain embodiments are drawn to methods that can result in increased yields of stabilized metal-containing nanoparticles having good dispersibility in organic solvents and suitable for use in fabrication of electronic features having high conductivity.

With the rise of the internet of things (IOT), conductive 3D printed objects can find many applications in creating smart components for automotive and rail, aerospace, military, home appliances and many other applications. These smart structures can be built by the incorporation of functional elements such as conductive tracks and electronics into 3D printed structures. This can enhance their functionality and create new higher value products. Most 3D printed structures are manufactured from polymeric materials. In order to fabricate 3D printed structural electronics, highly conductive materials that are compatible with structural materials used in 3D printing are required.

Solution processable metal-containing nanoparticles can be used to fabricate conducting features in electronic devices (such as electrodes and electrical interconnectors, among others) by low-cost solution deposition and patterning techniques. However, there have been challenges in synthesizing high quality, solution processable conducting materials (such as silver nanoparticles) on a large scale.

Additionally, most available conductive inks that employ metal-containing nanoparticles need to be annealed at very high temperatures which can lead to the melting/softening of low melting point or low glass transition temperature, polymeric structures, including those made by 3D printing methods.

Commercial nanoparticles are available. One such nanoparticle is synthesized by reducing a silver salt and then including a stabilizing binder made from dodecylamine around the resulting particles.

It would be desirable to have methods for the production of solution processable conducting materials of consistent quality that could be performed on a scale suitable for commercial manufacturing. There is also a need to develop conductive inks that anneal at lower temperature to enable fabrication of conductive objects using low temperature substrate materials, such as the materials employed in 3D printing. The ink annealing temperature depends on the nanoparticle that is used to formulate the ink.

SUMMARY

An embodiment of the present disclosure is directed to a nanoparticle composition. The nanoparticle composition comprises a plurality of stabilized metal-containing nanoparticles comprising silver and/or a silver alloy composite. The stabilized metal-containing nanoparticles are prepared by a method comprising reacting a silver compound with a reducing agent comprising a hydrazine compound by incrementally adding the silver compound to a first mixture comprising the reducing agent, a stabilizer and a solvent. The stabilizer comprises a mixture of a first organoamine and a second organoamine, an alkyl moiety of the first organoamine having a longer carbon chain length than an alkyl moiety of the second organoamine. The first organoamine is selected from the group consisting of decylamine, undecylamine, dodecylamine, tridecylamine, tetradecylamine and mixtures thereof. The second organoamine is selected from group consisting of butylamine, pentylamine, hexylamine, heptylamine, octylamine, nonylamine, decylamine and mixtures thereof.

Another embodiment of the present disclosure is directed to a process for preparing stabilized metal-containing nanoparticles comprising silver and/or a silver alloy composite. The process comprises reacting a silver compound and/or a silver complex with a reducing agent comprising a hydrazine compound at a temperature ranging from about 20° C. to about 60° C. The reaction is carried out by incrementally adding the silver compound and/or the silver complex to a mixture comprising the reducing agent, a stabilizer and a solvent. The stabilizer comprises a mixture of a first organoamine and a second organoamine, an alkyl moiety of the first organoamine having a longer carbon chain length than an alkyl moiety of the second organoamine. The first organoamine is selected from the group consisting of decylamine, undecylamine, dodecylamine, tridecylamine, tetradecylamine and mixtures thereof. The second organoamine is selected from group consisting of butylamine, pentylamine, hexylamine, heptylamine, octylamine, nonylamine, decylamine and mixtures thereof.

An embodiment of the present disclosure is directed to a conductive ink composition. The composition comprises a plurality of stabilized metal-containing nanoparticles comprising silver and/or a silver alloy composite and at least one ink vehicle. The plurality of stabilized metal-containing nanoparticles are dispersed in the ink vehicle. The stabilized metal-containing nanoparticles are prepared by a first method comprising reacting a silver compound with a reducing agent comprising a hydrazine compound by incrementally adding the silver compound to a first mixture comprising the reducing agent, a stabilizer and a solvent. The stabilizer comprises a mixture of a first organoamine and a second organoamine, an alkyl moiety of the first organoamine having a longer carbon chain length than an alkyl moiety of the second organoamine. The first organoamine is selected from the group consisting of decylamine, undecylamine, dodecylamine, tridecylamine, tetradecylamine and mixtures thereof. The second organoamine is selected from group consisting of butylamine, pentylamine, hexylamine, heptylamine, octylamine, nonylamine, decylamine and mixtures thereof.

DETAILED DESCRIPTION

An embodiment of the present disclosure is directed to stabilized metal-containing nanoparticles prepared by adding a metal compound or a mixture of a metal compound and a stabilizer (e.g., a silver compound or a mixture of a silver compound and a stabilizer) to a reaction mixture. The reaction mixture contains a reducing agent, a stabilizer and solvents. Upon addition of the metal compound or the mixture of the metal compound and the stabilizer to the reaction mixture, the metal compound reacts with the reducing agent to form the stabilized metal-containing nanoparticles. In some embodiments, the reducing agent can include a hydrazine compound. The stabilizer can comprise a mixture of a first organoamine and a second organoamine, an alkyl moiety of the first organoamine having a longer carbon chain length than the alkyl moiety of the second organoamine. The first organoamine can be selected, for example, from the group consisting of decylamine, undecylamine, dodecylamine, tridecylamine, tetradecylamine and mixtures thereof. The second organoamine can be selected, for example, from the group consisting of butylamine, pentylamine, hexylamine, heptylamine, octylamine, nonylamine, decylamine and mixtures thereof. In an embodiment, the reaction of the metal compound with the reducing agent can be carried out at, for example, a temperature between about 20° C. and about 60° C.

By employing organic stabilizers having at least two different carbon chain lengths, certain benefits can be achieved. These benefits can include the ability to form relatively small nanoparticles, relative high conductivities and/or to employ relatively low annealing temperatures for conductive inks made by the particles, as will be discussed in greater detail herein below.

The order of adding the ingredients as described above can also provide advantages, as described in more detail in U.S. Pat. No. 9,725,614, the disclosure of which is incorporated herein by reference in its entirety. In particular, there are advantages to mixing the reducing agent and stabilizer prior to adding the metal compounds as compared with other processes in which the metal compound and stabilizer are first mixed, followed by the addition of the reducing agent. These advantages include, for example, that the resulting nanoparticles can have lower silver content or higher stabilizer content in the dry powder measured by the ash method, indicating the nanoparticles can be better stabilized with a stabilizer, such as an organoamine. Such nanoparticles can provide better solution solubility, higher yield for conductive ink preparations, higher ink conductivity and better ink jettability. Furthermore, the reduction reaction can be carried out at much lower temperatures without gelling or solidification of the reaction mixture.

Certain embodiments are drawn to processes for preparing stabilized metal-containing nanoparticles comprising silver and/or a silver alloy composite (e.g., stabilized silver nanoparticles, among others). The processes comprise reacting a silver compound with a reducing agent comprising a hydrazine compound at a temperature between about 20° C. and about 60° C.; about 25° C. and about 55° C.; about 30° C. and about 50° C.; or about 30° C. and about 45° C. The reaction can be carried out by incrementally adding the silver compound or a mixture of the silver compound and a stabilizer to a solution comprising (a) the reducing agent, (b) a stabilizer comprising a first organoamine and a second organoamine, as described herein, and (c) a solvent or a mixture of solvents. In embodiments, the total mole ratio of the stabilizer to the silver compound in the reaction mixture can be in the range of about 1:1 to about 10:1. For example, the mole ratio of the stabilizer to the silver compound can be about 1 to about 1; about 3 to about 1; about 5 to about 1; or about 10 to about 1.

Some embodiments are drawn to processes for producing stabilized silver nanoparticles comprising (a) providing a mixture of a reducing agent, a stabilizer and a solvent; (b) (i) incrementally adding a silver compound to the mixture and/or (ii) incrementally adding a complex comprising a silver compound to the mixture, wherein the temperature of the mixture can be maintained below about 60° C. but not limited as the mixture is reacted, wherein the stabilizer comprises a first organoamine and a second organoamine, as described herein, and wherein the reaction mixture has a substantially constant silver ion concentration during the period of incrementally adding the silver compound and/or the complex comprising a silver compound (e.g., silver complex). In further embodiments, the silver ion concentration remains low in the reaction mixture. The silver complex (e.g., complex comprising a silver compound) may comprise a silver salt and an organoamine complex, for example silver carboxylate and an organoamine complex. This is in contrast to the process where a reducing agent is added to a mixture containing a silver compound, a solvent, where the silver ion concentration in the reaction mixture changes dramatically during the period of adding the reducing agent (very high at the beginning and reduce to very low at the end of reducing agent addition). Without being limited by theory, the substantially constant silver ion concentration in the reaction mixture can be beneficial in achieving a uniform particle size. The substantially constant silver ion concentration may be where the silver ion concentration varies by less than about 25%; less than about 15%; less than about 10%; less than about 5%; or less than about 3% during the reaction or during the period of incrementally adding a silver compound and/or silver complex.

The term "nano" as used in "metal-containing nanoparticles" refers to, for example, a particle size of less than about 100 nm, such as, for example, from about 0.5 nm to about 100 nm, from about 1 nm to about 50 nm, from about 1 nm to about 20 nm, from about 1 nm to about 15 nm, or from about 1 to about 10 nm. The particle size refers to the average diameter of the metal-containing particles, as determined by TEM (transmission electron microscopy) or other suitable method. Generally, a plurality of particle sizes can exist in the metal-containing nanoparticles obtained from the process described herein. In embodiments, the existence of different sized silver-containing nanoparticles is acceptable.

Metal-containing nanoparticles prepared by embodiments can have excellent solution processability and can be used in the fabrication of various electronic features requiring high conductivity. The stabilized metal-containing nanoparticles comprise (a) a metal nanoparticle core containing silver or silver-alloy composite and (b) a stabilizer surface coating. In some embodiments, the stabilized metal-containing nanoparticles can be organoamine stabilized silver nanoparticles. In embodiments, the stabilized metal-containing nanoparticles can have a metal content of at least about 65 weight percent, at least about 85 weight percent, or at least about 90 weight percent. The weight percentage of the metal in the stabilized metal-containing nanoparticle can be from, for example, about 40 weight percent to about 97 weight percent, about 65 weight percent to about 95 weight percent, about 80 to about 95 weight percent, or about 90 to about 95 weight percent.

In certain embodiments the silver compound can be selected from the group consisting of silver acetate, silver nitrate, silver oxide, silver acetylacetonate, silver benzoate, silver bromate, silver bromide, silver carbonate, silver chloride, silver citrate, silver fluoride, silver iodate, silver iodide, silver lactate, silver nitrite, silver perchlorate, silver phosphate, silver sulfate, silver sulfide and silver trifluoroacetate. In some embodiments the silver compound used in preparing the metal-containing nanoparticles can be a silver salt selected from the group consisting of silver acetate, silver trifluoroacetate, silver halide, silver sulfate, silver nitrate, silver hydrocarbylsulfonate and a mixture of two or more thereof. The silver compound can be silver acetate in certain embodiments. The silver compound or a mixture of silver compound or a mixture of silver compound and a stabilizer can be added to the solution containing the reducing agent, stabilizer and solvent as a component of a metal-containing solution or as a powder form. The silver compound can comprise silver or a silver alloy composite and in certain embodiments the silver compound can optionally further comprise other metals or metal alloys. In some embodiments, the metal-containing solution or the powder, in addition to a silver compound, can comprise a metal selected from the group consisting of aluminum, gold, platinum, palladium, copper, cobalt, chromium, indium, nickel and mixtures of two or more thereof. In certain embodiments, the metal-containing solution or the powder can comprise a composite selected from the group consisting of Au—Ag, Ag—Cu, Ag—Ni, Au—Cu, Au—Ni, Au—Ag—Cu and Au—Ag—Pd. The metal-containing solution or powder comprising silver can also include non-metals, such as, for example, Si, C and Ge among others. During reaction, the silver compound (for example as part of a metal-containing solution or powder) can be added to the solution containing the reducing agent and stabilizer over a period of time ranging from about 1 minute to about 6 hours; from about 10 minutes to about 4 hours; or about 20 minutes to about 2 hours.

In an embodiment, the stabilized metal-containing nanoparticles comprising a silver alloy composite can comprise a silver alloy composite selected from the group consisting of a silver-copper composite, a silver-gold-copper composite, silver-gold-palladium composite and mixtures of two or more thereof. In certain embodiments, the stabilized metal-containing nanoparticles comprising silver and/or a silver alloy composite further comprise a metal selected from the group consisting of aluminum, gold, platinum, palladium, copper, cobalt, chromium, indium, nickel and mixtures of two or more thereof. In some embodiments, the stabilized metal-containing nanoparticles comprising silver and/or a silver alloy composite further comprise gold, platinum, palladium, copper, cobalt, chromium, nickel, or mixtures thereof. The stabilized metal-containing nanoparticles can comprise a composite selected from the group consisting of Au—Ag, Ag—Cu, Ag—Ni, Au—Cu, Au—Ni, Au—Ag—Cu and Au—Ag—Pd, in certain embodiments. The stabilized metal-containing nanoparticles can also include non-metals, such as, for example, Si, C and Ge, among others.

In embodiments, the reducing agent used in preparing the stabilized metal-containing nanoparticles comprises a hydrazine compound. The hydrazine compound can be selected from the group consisting of hydrazine or its corresponding salt, a hydrocarbylhydrazine, a hydrocarbylhydrazinium salt, a carbohydrazide, a semicarbazide, a sulfonohydrazide, or a mixture of two or more thereof. In some embodiments the hydrazine compound can be phenylhydrazine. The mole ratio of the reducing agent to silver compound can be in the range of 1:2.5 to 1:1.5, but not limited thereto. For example, the mole ratio of the reducing agent to the silver compound can be about 1 to 2; about 1 to 1.98; or about 1 to 1.90.

In embodiments, the stabilizer, in the form of a plurality of ligands formed from the first organoamine and the second organoamine, can be physically or chemically associated with the surface of the metal-containing nanoparticles to yield stabilized metal-containing nanoparticles. The metal-containing nanoparticles with the stabilizer thereon (stabilized metal-containing nanoparticles) can be isolated and recovered from a reaction mixture used in forming the nanoparticle and stabilizer complex. The stabilized metal-containing nanoparticles can thus be subsequently readily and homogeneously dispersed in an ink vehicle for forming a conductive ink composition (printable solution).

As used herein, the phrase "physically or chemically associated" between the metal-containing nanoparticles and the stabilizer can be a chemical bond and/or other physical attachment. The chemical bond can take the form of, for example, covalent bonding, hydrogen bonding, coordination complex bonding, or ionic bonding, or a mixture of different chemical bonds. The physical attachment can take the form of, for example, van der Waals' forces or dipole-dipole interaction, or a mixture of different physical attachments.

In an embodiment, the first organoamine is selected from the group consisting of decylamine, undecylamine, dodecylamine, tridecylamine, tetradecylamine and mixtures thereof. In yet another embodiment, the first organoamine is selected from the group consisting of undecylamine, dodecylamine, tridecylamine and mixtures thereof. In an embodiment, the first organoamine is dodecylamine. In an embodiment, the second organoamine is selected from the group consisting of butylamine, pentylamine, hexylamine, heptylamine, octylamine, nonylamine, decylamine and mixtures thereof. In an embodiment, the second organoamine is selected from the group consisting of hexylamine, heptylamine, octylamine, nonylamine, decylamine and mixtures thereof. In an embodiment, the second organoamine is selected from the group consisting of heptylamine, octylamine, nonylamine and mixtures thereof. In an embodiment, the first organoamine is dodecylamine and the second organoamine is octylamine. Such mixtures of organoamines can provide various benefits compared with using a single amine, as described herein.

Where a first and second organoamine are used, any suitable ratio of the first organoamine to the second organoamine can be used that will provide the desired small particle sizes and low temperature anneal. For instance, the molar ratio of the first organoamine to the second organoamine employed in the compositions for making the nanoparticles can range from about 1:5 to about 5:1, such as about 1:4 to about 4:1, or about 1:3 to about 3:1, or about 3:2 to about 2:3, or about a 1:1 ratio. In an embodiment where the first organoamine is dodecylamine and the second organoamine is octylamine, the amounts of organoamines employed to make the nanoparticles can range, for example, from about 30 mole % to about 80 mole %, such as about 35 mole % to about 75 mole %, octylamine and about 70 mole % to about 20 mole %, such as about 65 mole % to about 25 mole %, dodecylamine, based on the total molar amount of organoamine (e.g., total amount of octylamine and dodecylamine) added as a stabilizer for making the metal-containing nanoparticles. In another embodiment, the range is about 40 mole % to about 60 mole % octylamine and about 60 mole % to about 40 mole % of dodecylamine, or about 45 mole % to about 55 mole % octylamine and about 55 mole % to about 45 mole % of dodecylamine, or about 50 mole % octylamine and about 50 mole % of dodecylamine, based on the total molar amount of organoamine added as a stabilizer for making the metal-containing nanoparticles.

In an embodiment, additional organoamines that are different from the first and second organoamines may be used. For example, additional stabilizers can optionally be chosen from any of butylamine, pentylamine, hexylamine, heptylamine, octylamine, nonylamine, decylamine, undecylamine, dodecylamine, tridecylamine, tetradecylamine, hexadecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures of two or more thereof.

As shown in the examples herein below, in one embodiment, silver nanoparticles may be effectively stabilized using a mixture of octylamine and dodecylamine binders. The use of both octylamine and dodecylamine resulted in stabilized silver particles of small size (e.g. less than 100 nm) with a lower annealing temperature than a particle with 100% dodecylamine stabilizer. Use of octylamine alone did not provide the desired stabilization and so resulted in particles that were too large. In an embodiment, inks formulated from the particles that were made using both dodecylamine and octylamine are able to be annealed at low temperatures (e.g., 60° C. or less) in a short time (10-30 minutes) to give highly conductive traces (>10,000 s/cm). Such low anneal temperatures will enable the printing of conductive traces on many substrates that are sensitive to high temperatures, such as plastic films and other polymeric objects. It will also allow low temperature deposition of conductors (e.g. electrodes and other conductive elements) on polymer parts made by 3D printing, thereby making it possible to create smart components for many applications.

While the examples employed dodecylamine and octylamine, it is expected that certain other combinations of organoamines could also be employed to achieve reduced annealing temperatures when compared with dodecylamine alone. For instance, based on the results using octylamine and dodecylamine, it is expected that any one of hexylamine, heptylamine, nonylamine and decylamine could be used in combination with dodecylamine to achieve an anneal temperature that is lower than if dodecylamine were used alone. It is also expected that dodecylamine and various combinations of two or more of hexylamine, heptylamine, octylamine, nonylamine, decylamine and undecylamine could be employed to achieve an anneal temperature that is lower than if dodecylamine were used alone.

The extent of the coverage of stabilizer on the surface of the metal-containing nanoparticles can vary, for example, from partial to full coverage depending on the capability of the stabilizer to stabilize the metal-containing nanoparticles. Of course, there is variability as well in the extent of coverage of the stabilizer among the individual metal-containing nanoparticles. In embodiments, the coverage can be sufficient to increase dispersibility/stability of the metal-containing nanoparticles in an ink vehicle/organic solvent, as compared to the same metal-containing nanoparticles without a stabilizer.

The weight percentage of the organic stabilizer in the stabilized metal-containing nanoparticles (including only the metal nanoparticle and the stabilizer) can be from, for example, about 3 weight percent to about 60 weight percent, from about 5 weight percent to about 35 weight percent, from about 5 weight percent to about 20 weight percent, or from about 5 weight percent to about 10 weight percent.

The solvent component of the reaction mixture containing the reducing agent, silver compound and the stabilizer can be a mixture of two types of solvents. The first type of organic solvent can be less polar than the second type of organic solvent. In some embodiments, the first type of organic solvent can be decalin and the second type of organic solvent can be methanol.

The first type of organic solvent can facilitate the dispersion of the stabilized metal nanoparticles formed during the reaction process. In embodiments, the polarity index (PI) of the first type of organic solvent can be about 3.0 or lower and it can be an organic hydrocarbon solvent containing from about 6 to about 28 carbon atoms, which may be substituted or unsubstituted and can be an aliphatic or aromatic hydrocarbon. Exemplary hydrocarbons may include aliphatic hydrocarbons such as heptane, undecane, dodecane, tridecane, tetradecane, isoparaffinic hydrocarbons such as isodecane, isododecane and commercially available mixtures of isoparaffins such as ISOPAR E, ISOPAR G, ISOPAR H, ISOPAR L and ISOPAR M (all the above-mentioned manufactured by Exxon Chemical Company) and the like; cyclic aliphatic hydrocarbons such as bicyclopropane, bicyclopentane, bicyclohexane, cyclopentylcyclohexane, spiro[2,2]heptane, bicyclo[4,2,0]octanehydroindane, decahydronaphthalene (i.e., bicyclo[4.4.0]decane or decalin) and the like; aromatic hydrocarbons such as toluene, benzene, chlorobenzene, o-dichlorobenzene; and mixtures thereof.

In some embodiments, the first type of organic solvent can be a hydrocarbon selected from the group consisting of toluene, xylene, decalin, bicyclohexane and mixtures thereof. Toluene has a polarity index of 2.3-2.4; xylene has a polarity index of 2.4-2.5; an estimated polarity index of decalin and bicyclohexane should be similar to the polarity index of cyclohexane (PI=0.2) and less than 0.5. In some embodiments, the first type of organic solvent can be decalin, which is also known as decahydronaphthalene and has the formula $C_{10}H_{18}$. The first type of solvent may also be a mixture of one, two, three or more solvents, which may be present at any suitable volume ratio or mass ratio.

The second type of organic solvent can be more polar than the first type of organic solvent. The second type of solvent can have a good solubility for the reducing agent. In embodiments, the polarity index of the second organic solvent can be higher than 3.0. Exemplary second solvents include either an alcohol, ether, ketone, ester, methylene chloride (PI=3.4) and mixtures thereof. It should be noted that not all alcohols, ethers, ketones and esters have a polarity index higher than 3.0. Exemplary alcohols include methanol (PI=5.1-6.6), ethanol (PI=5.2), n-propanol (PI=4.0-4.3), n-butanol (PI=3.9-4.0), isobutyl alcohol (PI=3.9), isopropyl alcohol (PI=3.9-4.3), 2-methoxyethanol (PI=5.7) and the like. Exemplary ethers include tetrahydrofuran (THF) (PI=4.0-4.2), dioxane (PI=4.8) and the like. Exemplary ketones include acetone (PI=5.1-5.4), methyl ethyl ketone (PI=4.5-4.7), methyl n-propyl ketone (PI=4.5), methyl isobutyl ketone (PI=4.2) and the like. Exemplary esters include ethyl acetate (PI=4.3-4.4), methyl acetate (PI=4.4), n-butyl acetate (4.0) and the like. In certain embodiments, the second solvent can be selected from the group consisting of methanol, ethanol, n-propanol, isopropanol, n-butanol, isobutanol, methyl ethyl ketone, ethyl acetate, tetrahydrofuran, 1,4-dioxane and mixtures thereof. In some embodiments, the second type of solvent can be methanol. The second type of solvent may also be a mixture of one, two, three or more solvents, which may be present at any suitable volume ratio or mass ratio.

The first type of solvent and second type of solvent may not be soluble with each other. In other words, the first and second types of solvent separate into two visually detectable phases when mixed together.

In some embodiments, the first type of organic solvent has a polarity index of 2.5 or lower and the second type of organic solvent has a polarity index of 3.5 or higher. In other embodiments, the difference in the polarity index between the first solvent and the second solvent can be at least 2.0. In other words, the polarity index of the second solvent minus the polarity index of the first solvent can be 2.0 or greater.

In some embodiments, the component of the reaction solvent may contain only one of the first type of solvents or a mixture of the first type of solvents with polarity index (PI) of less than 3.

After the reaction is completed, an additional amount of the second type of solvent can be added to precipitate the organoamine-stabilized silver nanoparticles. Generally, the total amount of the second type of solvent in the final mixture can be greater than the amount of the first type of solvent in the final mixture; this encourages precipitation. In embodiments, the final volume ratio of the first type of solvent to the second type of solvent may be from about 1:2 to about 1:5.

The silver nanoparticles formed by the disclosed processes exhibit improved size uniformity and solubility. The yield of ink preparations comprising such nanoparticles can be significantly increased in various proper ink solvents. Low annealing temperatures can be used with nanoparticles produced according to the present disclosure without sacrificing conductivity. The stabilized metal-containing nanoparticles produced in certain embodiments can have an annealing point of lower than about 130° C.; lower than about 120° C.; or lower than about 110° C. In particular embodiments, the annealing temperature can be from about 50° C. to about 110° C., such as about 60° C. to about 100° C., or 50° C. to about 80° C., or 55° C. to about 70° C., or 55° C. to about 65° C. At the annealing point the stabilized metal-containing nanoparticles form a metal framework with a conductivity of at least about 1000 S/cm; at least about 2,000 S/cm; at least about 5,000 S/cm; at least about 10,000 S/cm at least about 30,000 S/cm; at least 50,000 S/cm; or at least 100,000 S/cm. In embodiments, the conductivity achieved by the annealing temperatures and times described in the present disclosure can range, for example, from about 10,000 Siemens/centimeter ("S/cm") to about 500,000 S/cm, or about 20,000 S/cm to about 500,000 S/cm, or about 30,000 S/cm to about 500,000 S/cm. The conductivities reported herein can be determined using the Keithley 4200A-CSC to measure resistance at room temperature (e.g., about 25° C.) and the Dektak stylus profile to measure film thickness.

Stabilized metal-containing nanoparticles produced by methods disclosed herein can have an increased dispersibility, in various organic solvents, such as decalin, as compared to stabilized metal-containing nanoparticles prepared by a method comprising providing a reaction mixture of silver compound and stabilizer and adding reducing agent to the reaction mixture, where the silver compound, the stabilizer and the reducing agent in both methods are the same.

Some embodiments are drawn to conductive ink compositions comprising: (a) a plurality of stabilized metal-containing nanoparticles comprising silver and/or a silver alloy composite and a stabilizer surface coating and (b) at least one ink vehicle, wherein the plurality of stabilized metal-containing nanoparticles are dispersed in the ink vehicle. The stabilized metal-containing nanoparticles are prepared by a first method comprising reacting a silver compound with a reducing agent comprising a hydrazine compound at a temperature between about 20° C. and about 60° C. by incrementally adding the silver compound or a mixture of the silver compound and a stabilizer to a first mixture comprising the reducing agent, a stabilizer comprising an organoamine and a solvent, wherein the organoamine comprises a first organoamine and a second organoamine, as described herein. In certain embodiments the silver compound can be reacted with the reducing agent at a temperature between about 20° C. and about 55° C.; about 30° C. and about 50° C.; or about 30° C. and about 45° C. The conductive ink compositions described herein contain a stabilizer that can be associated with the surface of metal-containing nanoparticles and in some embodiments, the stabilizer may not be removed until annealing of the metal-containing nanoparticles during formation of metal features on a substrate.

The stabilized metal-containing nanoparticles in the conductive ink compositions can be as described above and prepared by methods as described herein. In embodiments the conductive ink composition can comprise greater than about 15 weight percent, greater than about 25 weight percent, greater than about 30 weight percent, or greater than about 35 weight percent silver. For example, the conductive ink composition can comprise 15 weight percent to 85 weight percent silver, such as 25 weight percent to 80 weight percent, or 35 weight percent to 75 weight percent silver, based on the total weight of the ink composition. In an embodiment, the metal-containing nanoparticles employed in an inkjet ink comprise about 40 weight percent to about 50 weight percent silver, such as about 42 weight percent to about 48 weight percent or about 43 weight percent to about 45 weight percent. In an embodiment, the metal-containing nanoparticles employed in an aerosol ink comprise about 60 weight percent to about 70 weight percent silver, such as about 62 weight percent to about 68 weight percent or about 63 weight percent to about 67 weight percent. The stabilized metal-containing nanoparticles can be present in an amount of from about 10 to about 90 percent by weight of the total weight of the conductive ink composition, from about 20 to about 60 percent by weight of the total weight of the conductive ink composition, or from about 30 to about 50 percent by weight of the total weight of the conductive ink composition.

The stabilized metal-containing nanoparticles used as components of conductive ink compositions of embodiments can have a stability (that is, the time period where there is minimal precipitation or aggregation of the metal-containing nanoparticles in the composition) of, for example, from about 1 week to about 1 month, from about 1 week to about 2 months, from about 1 week to 3 months, from about 1 week to over 1 year. The stability can be monitored using a variety of methods, for example, a dynamic light scattering method that probes the particle size, a simple filtration method using a determined filter pore size, for example 1 micron, to evaluate the solid on the filter or solid remained in the ink after filtration by ash.

In embodiments, any suitable solvent having a polarity index (PI) in the range from about 0.0 to about 3.5 can be used to dissolve or to disperse the silver nanoparticles, including a hydrocarbon, a heteroatom-containing aromatic compound, an alcohol and mixtures thereof. Exemplary heteroatom-containing aromatic compounds include chlorobenzene, chlorotoluene, dichlorobenzene and nitrotoluene. In embodiments, the solvent can be a hydrocarbon solvent containing about 6 carbon atoms to about 28 carbon atoms, such as an aromatic hydrocarbon containing from about 7 to about 18 carbon atoms, a linear or a branched aliphatic hydrocarbon containing from about 8 to about 28 carbon atoms, or a cyclic aliphatic hydrocarbon containing from about 6 to about 28 carbon atoms. In some embodiments, the solvent can be an alcohol, including terpineols such as alpha-terpineol, beta-terpineol, gamma-terpineol and mixtures thereof.

In some embodiments, the ink vehicle can comprise an aliphatic hydrocarbon, such as a cyclic aliphatic hydrocarbon. The ink vehicle can comprise at least one compound selected from the group consisting of aliphatic hydrocarbons comprising at least one cyclohexane ring such as bicyclohexane, decahydronaphthalene, tetralin, hexalin, cyclic terpenes (including monocyclic monoterpenes such as limonene and selinene), together with bicyclic monoterpene, cyclic terpinene (such as cyclodecene), 1-phenyl-1-cyclohexene, 1-tert-butyl-1-cyclohexene, terpinolene, γ-terpinene, α-terpinene, α-pinene, terpineol, methylnanphthalene and mixtures thereof. In some embodiments, the ink vehicle can comprise decahydronaphthalene and bicyclohexane.

The ink vehicle can comprise a solvent in certain embodiments. In some embodiments, the conductive ink composition can comprise an ink vehicle that is a solvent or that comprises one or more solvents. The selection of the solvents used in conductive ink compositions can be based on various properties, for example, evaporation rates, boiling points and interaction with other ink components like the stabilized metal-containing nanoparticles. In embodiments, the conductive ink composition can comprise two or more solvents having different evaporation rates. In some embodiments, the conductive ink composition can comprise an ink vehicle comprising one or more solvents having a boiling point of at least 150° C., or from about 150° ° C. to about 380° C., or from about 180° C. to about 280° C.

The ink vehicle can facilitate the dispersion of the stabilized metal-containing nanoparticles. The ink vehicle can comprise aromatic hydrocarbons such as benzene, toluene, xylene, ethylbenzene, chlorobenzene, chlorotoluene, dichlorobenzene and nitrotoluene. In some embodiments, the ink vehicle can be decalin and tetralin, an alkane, alkene or an alcohol having from about 10 to about 18 carbon atoms such as, undecane, dodecane, tridecane, tetradecane, hexadecane, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, terpineol (α-terpineol), β-terpineol, 4-terpineol and the like; isoparaffinic hydrocarbons, such as, for example, isodecane, isododecane and commercially available mixtures of isoparaffins such as ISOPAR E, ISOPAR G, ISOPAR H, ISOPAR L and ISOPAR M (all the above-mentioned manufactured by Exxon Chemical Company), SHELLSOL (made by Shell Chemical Company), SOLTROL (made by Philips Oil Co., Ltd.), BEGASOL (made by Mobil Petroleum Co., Inc.) and IP Solvent 2835 (made by Idemitsu Petrochemical Co., Ltd.); naphthenic oils; and mixtures thereof. One, two, three or more ink vehicles/solvents can be used.

In embodiments where two or more solvents are used, each solvent can be present at any suitable volume ratio or weight ratio such as for example from about 99 (first solvent):1 (second solvent) to about 1 (first solvent):99 (second solvent), including the volume ratio or weight molar ratio from about 80 (first solvent):20 (second solvent) to about 20 (first solvent):80 (second solvent). For example, the ink vehicle can be a mixture comprised of a solvent selected from the group consisting of terpineol, hexanol, heptanol, cyclohexanol, 3,7-dimethylocta-2,6-dien-1ol, 2-(2-propyl)-5-methyl-cyclohexane-1-ol and the like and at least one solvent selected from the group consisting of decalin, hexadecane, hexadecene, 1,2,4-trimethylbenzene, bicyclohexane and the mixtures thereof.

The ink vehicle (e.g., solvent) can be present in the silver ink composition in an amount of at least 5 weight percent of the composition, such as for example from about 10 weight percent to about 90 weight percent, from about 20 weight percent to about 80 weight percent, from about 30 weight percent to about 70 weight percent and from about 40 weight percent to about 60 weight percent of the composition.

The conductive ink composition can have a surface tension from about 25 mN/m to about 35 mN/m, including from about 28 mN/m to about 33 mN/m. The composition can also have a viscosity from about 2 cps to about 50 cps, including from about 3 cps to about 15 cps.

In embodiments, the ink vehicle(s)/solvent(s) can be present in an amount of from about 5 to about 90 percent by weight of the total weight of the conductive ink composition, including from about 20 to about 80 percent by weight or from about 30 to about 70 percent by weight of the conductive ink composition.

Certain conductive ink compositions can further comprise a resin. The resin can improve adhesion to substrates in some embodiments. The resin can be selected from the group consisting of terpene, styrene block copolymers such as styrene-butadiene-styrene copolymer, styrene-isoprene-styrene copolymer, styrene-ethylene/butylenes-styrene copolymer and styrene-ethylene/propylene copolymer, ethylene-vinyl acetate copolymers, ethylene-vinyl acetate-maleic anhydride terpolymers, ethylene butyl acrylate copolymer, ethylene-acrylic acid copolymer, polyolefins, polybutene, polyamides and the like and mixtures thereof. In some embodiments, the conductive ink composition can comprise a polyvinyl alcohol derivative resin. Examples of polyvinyl alcohol derivative resins are polyvinyl butyral resins (PVB) include those resins manufactured under the trade name MOWITAL (Kuraray America), S-LEC (Sekisui Chemical Company), BUTVAR (Solutia, Inc.) and PIOLOFORM (Wacker Chemical Company). In embodiments, the resin can be present in an amount of from about 0.05 to about 5 percent by weight of the total weight of the conductive ink composition. In certain embodiments, the resin can be present in an amount of from about 0.1 to about 3 percent by weight of the total weight of the conductive ink composition.

The fabrication of conductive features, such as an electrically conductive element, from the conductive ink composition can be carried out by depositing the composition on a substrate using any suitable liquid deposition technique at any suitable time prior to or subsequent to the formation of other optional layer or layers on the substrate. Thus, liquid deposition of the conductive ink composition on the substrate can occur either on a substrate or on a substrate already containing layered material, for example, a semiconductor layer and/or an insulating layer.

The phrase "liquid deposition technique" refers to, for example, deposition of a conductive ink composition using a liquid process such as printing or liquid coating, where the liquid is a homogeneous or heterogeneous dispersion of the stabilized metal-containing nanoparticles within a liquid (solvent/ink vehicle). Examples of liquid coating processes include spin coating, blade coating, rod coating, dip coating and the like. Examples of printing techniques include lithography or offset printing, gravure, flexography, screen printing, stencil printing, inkjet printing, aerosol printing, stamping (such as microcontact printing) and the like. Liquid deposition deposits a layer or line of the conductive ink composition having a thickness ranging from about 5 nanometers to about 100 micrometers, such as from about 10 nanometers to about 50 micrometers on the substrate. The deposited conductive ink composition at this stage may or may not exhibit appreciable electrical conductivity.

The substrate upon which the metal (containing silver) features are deposited can be any suitable substrate, including, for example, silicon, glass plate, plastic film, sheet, fabric, polymeric structures, or paper. For structurally flexible devices, plastic substrates, such as for example polyester, polycarbonate, polyimide sheets and the like can be used. The thickness of the substrate can be from about 10 micrometers to over 10 millimeters with an exemplary thickness being from about 50 micrometers to about 2 millimeters for a flexible plastic substrate and from about 0.4 millimeters to about 10 millimeters for a rigid substrate such as glass, polymeric structures or silicon.

Heating the deposited conductive ink composition at a temperature of, for example, at or below about 150° C., such as, for example, from about 80° C. to about 150° C., from about 80° C. to about 140° C., from about 80° C. to about 130° C., from about 100° C. to about 120° C. and from about 100° C. to about 110° C. induces the metal-containing nanoparticles to "anneal" and thus forms an electrically conductive layer, which can be suitable for use as an electrically conductive element in electronic devices. For inks made from nanoparticles that are stabilized using two or more organoamines, as described herein above, the anneal temperatures can be even lower, such as from about 50° C. to about 110° C., such as about 60° C. to about 100° C., or 50° C. to about 80° C., or 55° C. to about 70° C., or 55° C. to about 65° C. The heating temperature can be one that does not cause adverse changes in the properties of previously deposited layer(s) or the substrate (whether single layer substrate or multilayer substrate).

The heating can be performed for a time ranging from, for example, about 1 second to about 100 hours, from about 10 seconds to about 1 hour and from about 5 minutes to about 30 minutes, or about 5 minutes to about 40 minutes, or about 10 minutes to about 30 minutes. The heating can be performed in air, in an inert atmosphere, for example, under nitrogen or argon, or in a reducing atmosphere, for example, under nitrogen containing from about 1 to about 20 percent by volume hydrogen. The heating can also be performed under normal atmospheric pressure or at a reduced pressure of, for example, from about 1000 mbars to about 0.01 mbars.

As used herein, the term "heating" encompasses any technique(s) that can impart sufficient energy to the heated material or substrate to (1) anneal the metal-containing nanoparticles and/or (2) remove the stabilizer from the metal-containing nanoparticles. Examples of heating techniques can include thermal heating (for example, a hot plate, an oven and a burner), infra-red ("IR") radiation, a laser beam, flash light, microwave radiation, or UV radiation, or a combination thereof.

Heating produces a number of effects. Prior to heating, the layer of the deposited metal-containing nanoparticles can be electrically insulating or with very low electrical conductivity, but heating results in an electrically conductive layer composed of annealed metal-containing nanoparticles, which increases the conductivity. In embodiments, the annealed metal-containing nanoparticles can be coalesced or partially coalesced metal-containing nanoparticles. In embodiments, it can be possible that in the annealed metal-containing nanoparticles, the metal-containing nanoparticles achieve sufficient particle-to-particle contact to form the electrically conductive layer without coalescence.

In embodiments, after heating, the resulting electrically conductive line that has a thickness ranging, for example, from about 5 nanometers to about 5 microns, from about 10 nanometers to about 2 microns, from about 50 nanometers to about 300 nanometers, from about 50 nanometers to about 200 nanometers and from about 50 nanometers to about 150 nanometers.

The conductivity of the resulting metal element produced by heating the deposited conductive ink composition can be, for example, more than about 100 Siemens/centimeter ("S/cm"), at least about 1000 S/cm; at least about 2,000 S/cm; at least about 5,000 S/cm; at least about 10,000 S/cm; at least about 30,000 S/cm; at least 50,000 S/cm.

The resulting elements can be used as electrodes, conductive pads, interconnects, conductive lines, conductive tracks and the like in electronic devices such as thin film transistors, organic light emitting diodes, RFID (radio frequency identification) tags, photovoltaic devices, displays, printed antenna and other electronic devices which require conductive elements or components.

The following Examples further define and describe embodiments herein. Unless otherwise indicated, all parts and percentages are by weight.

EXAMPLES

Example 1—Small Scale Preparation of Stabilized Silver Nanoparticles According to Embodiments and Preparation of Silver Nanoparticle Ink Dodecylamine (88.91 g) (as a stabilizer) was heated to 40° C. in a mixture of decalin (30 mL) and methanol (6 mL) in a reaction flask under argon atmosphere until it dissolved. The temperature of the stabilizer (e.g., dodecylamine) solution was reduced to about 30° C. Phenylhydrazine (6.54 g) (as a reducing agent) was added to the cooled stabilizer solution with stirring. Silver acetate (20 g) was then gradually added over 2 hours while the reaction mixture was maintained at a temperature range between 30° C. and 35° C. The color of the reaction mixture changed from clear to dark brown as the silver acetate was added and indicated the formation of silver nanoparticles. After complete addition of the silver acetate, the reaction mixture was heated to 40° C. and stirred at this temperature for one hour.

Crude product was precipitated by adding methanol (100 mL) to the reaction mixture with stirring and the precipitated crude product was collected by filtration. The collected crude product was transferred to a glass beaker and stirred in methanol (50 mL). The final product was collected by filtration and dried in a vacuum oven at room temperature (about 25° C.) for 24 hours and yielded 13.11 g of dark blue colored silver nanoparticles. The silver content of the final product was about 87.6 weight percent, as measured by ash technique.

A silver nanoparticle ink was prepared from the silver nanoparticles having a silver content of about 87.6 weight percent. Five grams of a silver nanoparticle ink with a 40 weight percent solids content in decalin was prepared as follows: 3 g of decalin was added to 2 g of the stabilized silver nanoparticles in a small glass vial and the small glass vial was then gently rolled at room temperature for about 2 hours. The resulting mixture was filtered using a plastic Acrodisc 25 mm syringe filter with a 1 μm glass-fiber membrane and yielded 4.76 g of a conducting ink with a high filtration yield of about 95 weight percent. The prepared conducting ink contained 35.8 weight percent silver, which was determined by heating a small amount (0.5 g-1.0 g) of the ink at a high temperature (e.g., between 250° C. and 260° C.) to remove all of the stabilizer from the surface of the silver nanoparticles.

The ink prepared as described above was highly conductive. Its conductivity was tested with a spin-coated thin film on a glass substrate from a diluted ink (~20 weight percent). Additional solvent (decalin) was used to dilute the ink prepared as discussed above and a spin-coated thin film was prepared using the diluted ink. The spin-coated film was annealed at 120° C. for about 15 minutes on a hot plate and yielded a highly conductive silver layer. The thickness of the annealed film was about 92 nm and the conductivity was 37,000 S/cm, which was measured using a Keithley Model 236 Source-Measure Unit with 4-probes.

Example 2—Large Scale Preparation of Stabilized Silver Nanoparticles According to Embodiments and Preparation of Silver Nanoparticle Ink A similar synthetic process as described in Example 1 was carried out on a larger scale in a 6-L reaction flask to produce approximately 350 g of silver nanoparticles. The reaction procedure was carried out by gradually adding silver acetate to a mixture of dodecylamine and phenylhydrazine in a mixed solvent of decalin and methanol in a manner similar to that described in Example 1.

The jacket to a 6 liter reactor was set to 50° C. When the temperature of the jacket reached approximately 40° C., 724.4 g decalin was charged into the reactor, followed by 2396.5 g dodecylamine, 176.50 g phenylhydrazine and 176.5 g of methanol. Once all the liquid raw materials were charged, the reactor was cooled down to 35° C. before silver acetate was added. 539.4 g silver acetate was added to the reaction mixture over 2 hours. The reactor temperature was increased to 40° C. to start precipitation. 2133.70 g of methanol was added to the reactor over 25 minutes to isolate the silver nano-particles. After vacuum filtration to remove the mother liquor, the product was re-slurry washed with 534 g of methanol for 30 minutes followed by vacuum filtration to remove excess methanol. The silver content of the silver nanoparticles was 87% (by ASH).

In contrast to the poor solubilities of silver nanoparticles prepared using an existing synthetic process (6-L scale) (Comparative Example 1, below), the silver nanoparticles produced by this process showed excellent dispersibility. The large scale preparation permitted the production of inks having relatively high loads of silver nanoparticles with excellent electronic properties for use in electronic applications based on the amount of silver nanoparticles and silver content in the prepared ink after filtration, which indicated how easily the nanoparticles were dispersed in the solvents.

A silver nanoparticle ink was prepared using the silver nanoparticles (having a silver content of about 87 weight percent) synthesized from the large 6-L scale synthetic process. Ten grams of silver nanoparticle ink with 40 weight percent solid content in decalin was prepared by adding 6 g of decalin to 4 g of the silver nanoparticles in a glass bottle. The mixture was soaked for 24 hours and then stirred for 24 hours at room temperature. The resulting mixture was filtered using a plastic Acrodisc 25 mm syringe filter with a 1 µm glass-fiber membrane and yielded 9.65 g of a conducting ink with a high filtration yield of 96.5 weight percent. The prepared conducting ink contained 36.4 weight percent silver, which was determined by heating a small amount (0.5 g-1.0 g) of the ink at a high temperature (e.g., between 250° C. and 260° C.) to remove all of the stabilizer from the surface of the silver nanoparticles. The prepared ink was highly conductive with a conductivity of 33,000 S/cm, which was measured using a Keithley Model 236 Source-Measure Unit with 4-probes, as in Example 1.

Comparative Example 1—Preparation of Stabilized Silver Nanoparticles According to Existing Methods and Preparation of Silver Nanoparticle Ink Silver nanoparticles were prepared on a large scale (e.g., 6-L scale) using a known synthetic process by gradually adding a reducing agent including phenylhydrazine into a mixture of silver acetate, organoamine stabilizer and solvents (optional). The resulting silver nanoparticles had very poor dispersibility in decalin and filtered inks prepared with these silver nanoparticles had low silver contents. Good quality silver nanoparticle inks having high silver content could not be produced using the silver nanoparticles produced by this method. All the reagents and solvents, amounts and ink preparation procedures were similar to those described in Example 2.

Two inks (ink A and ink B) were prepared from different batches of dry silver nanoparticles synthesized using an existing synthetic process (gradually adding phenylhydrazine into a mixture of silver acetate and dodecylamine in organic solvents).

Ink A (5 g) in decalin (40 weight percent solid content loading) was prepared by adding 3 g of decalin into 2 g of silver nanoparticles, which were prepared by gradually adding phenylhydrazine into a mixture of silver acetate and dodecylamine in a mixed solvent of decalin and methanol. The resulting mixture was rolled for 2 days and stirred for 24 hours at room temperature. After filtration through a plastic Acrodisc 25 mm syringe filter with a 1 µm glass-fiber membrane, 2.85 g of ink or 57 weight percent of the unfiltered ink. The silver content of the filtered ink was only 14 weight percent.

Ink B (10 g) in decalin (40 weight percent solid content loading) was prepared by adding 6 g of decalin into 4 g of silver nanoparticles, which were prepared by gradually adding phenylhydrazine into a mixture of silver acetate and dodecylamine in toluene. The mixture was soaked for 24 hours at room temperature and stirred for 24 hours at room temperature and then filtered through a plastic Acrodisc 25 mm syringe filter with a 1 µm glass-fiber membrane. However, only a few drops of the filtered ink were obtained due to the poor dispersibility of the silver nanoparticles. The silver content of the filtered ink was only 6.2 weight percent.

Comparative Example 2: Synthesis of Silver Nanoparticles Using Dodecylamine (Control)

To a 2 L 3 neck round bottom flask, fitted with a magnetic stir bar, thermometer, condenser and Ar line, was added molten dodecylamine (444.77 g, melted overnight at 50° C. in oven). The reaction flask was immersed in warm water (35-40° C.). MeOH (29.26 mL) was added followed by decalin (149.78 mL). Phenylhydrazine (26.17 g) was added with magnetic stirring, using some of the decalin to complete the transfer. Mixture was stirred until completely homogeneous and temperature was allowed to stabilize at 35° C. Slowly added silver acetate powder through the top, maintaining the temperature at 35-40° C. After adding 70% of Silver acetate, the mixture became too viscous and stirring was too slow. The magnetic stirrer was replaced with a mechanical stirrer. Silver acetate was added over a period of 120 minutes. The reaction mixture was stirred for an additional 1 hour at 40° C.

MeOH (750 mL) was added and stirred for 10 minutes. Filtered the reaction product on a Buchner funnel with 2 filter media (Whatman 934AH glass fibre paper on bottom and Whatman #54 filter paper on top). Filtration took about 40 minutes. Filtrate was dark brown and filter cake was greyish-blue.

Sample was put in a brown bottle, flushed with Argon and stored in fridge. Particle size of the nanoparticle was assessed using Malvern dynamic light scattering and the results are shown in Table 1 below.

Example 3: Synthesis of Silver Nanoparticles Using 100% Octylamine

To a 250 mL 3 neck round bottomed flask, fitted with a magnetic stir bar, thermometer, condenser and Ar line, was added octylamine (31.01 g). The flask was immersed in warm water (35-40° C.). MeOH (1.50 mL) was added followed by decalin (7.49 mL). Phenylhydrazine (1.31 g) was added with stirring, using some of the decalin to complete the transfer. Stirred mixture until completely homogeneous and allowed temperature to stabilize at 35° C. Slowly added silver acetate powder while maintaining the temperature below 40° C. Solution turned brown upon adding silver acetate. Added the silver acetate over a period of 45 minutes. Allowed the reaction mixture to stir for another 1 hour at 40° C.

MeOH (7.5 mL) was added and stirred for 10 minutes during which a blue coating was formed on the walls of the flask, an indication of the formation of nanoparticles. The reaction product was filtered on a Buchner funnel with 2 filter media (Whatman 934AH glass fiber paper on bottom and Whatman #54 filter paper on top) to give a bluish-grey filter cake and a brown filtrate. Washed filter cake with MeOH (25 mL). Filter cake was put in a 30 mL brown bottle, flushed with argon and stored in fridge. Particle size of the nanoparticle was assessed using Malvern dynamic light scattering and the results are shown in Table 1 below.

Example 4: Synthesis of Silver Nanoparticles Using a 20:80 Ratio of Dodecylamine to Octylamine To a 100 mL 3 neck round bottomed reaction flask fitted with a magnetic stir bar, thermometer, condenser and Ar line, was added molten dodecylamine (22.21 g) and octylamine (79.21 g). The reaction flask was immersed in warm water (35-40° C.) and MeOH (7.5 mL) was added, followed by decalin (75 mL). Phenylhydrazine (13.09 g) was then added with stirring, using some of the decalin to complete the transfer. The mixture was stirred until completely homogeneous and the temperature was allowed to stabilize at 35° C. Silver acetate (25 g) powder was slowly added through the top of the reaction flask while maintaining the temperature at 35-40° C. Silver acetate was added over 50 minutes and the reaction mixture was stirred for another 1 hour at 40° C. MeOH (187.5 mL) was added and the mixture was stirred for 10 minutes. The reaction product was filtered on a Buchner funnel with 2 filter media (Whatman 934AH glass fiber paper on bottom and Whatman #54 filter paper on top). Filtration took about 15 minutes. Filtrate was dark brown and wet filter cake was bluish-grey. The wet filter cake was put in a 30 ml brown bottle, flushed with Argon and stored in fridge. The $Z_{ave}$ particle size of the nanoparticle was assessed by dynamic light scattering using a Malvern Nano Zetasizer and Nano Sizer and the results are shown in Table 1 below, where D[1,0] is the number mean (i.e., the average) size of the particles. Silver content (Ash) was assessed using MLS PYRO High Temperature Microwave Ash Furnace and the data is shown in Table 1 below.

Example 5: Synthesis of Silver Nanoparticles Using a 30:70 Ratio of Dodecylamine to Octylamine Silver nanoparticles were synthesized using a similar procedure as in Example 4 except that a ratio of 30:70 dodecylamine to octylamine was used.

Example 6: Synthesis of Silver Nanoparticles Using a 50:50 Ratio of Dodecylamine to Octylamine Silver nanoparticles were synthesized using a similar procedure as in Example 4 except that a ratio of 50:50 dodecylamine to octylamine was used.

Example 7: Synthesis of Nanoparticle Using a 60:40 Ratio of Dodecylamine to Octylamine Silver nanoparticles were synthesized using a similar procedure as in Example 4 except that a ratio of 60:40 dodecylamine to octylamine was used.

Example 8: Larder Scale Synthesis of Nanoparticle Using a 60:40 Ratio of Dodecylamine to Octylamine Silver nanoparticles were synthesized using a similar procedure as in Example 7 except that the scale was increased 10 times.

TABLE 1

Silver Nanoparticles with Different Stabilizers. The amount of $R_1$ and $R_2$ are each shown as mole % based on a total molar amount of organoamine added as a stabilizer for making the metal nanoparticles.

| Particle ID | $R_1$ ($C_{12}$) (Mole %) | $R_2$ ($C_8$) (Mole %) | Scale AgOAc Weight (g) | Particle size (nm) $Z_{ave}$ | D[1,0] | Ash (wt %) |
|---|---|---|---|---|---|---|
| Comparative Example 2 | 100% | 0 | 100 | 30 | 7.4 | ND |
| Example 3 | 0 | 100% | 5 | 433 | 7.3 | ND |
| Example 4 | 20% | 80% | 25 | 177.6 | 9.1 | 89.81 |
| Example 5 | 30% | 70% | 25 | 76.7 | 8.3 | ND |
| Example 6 | 50% | 50% | 35 | 10.3 | 7.8 | ND |
| Example 7 | 60% | 40% | 5 | 23 | 7.4 | 88.8 |
| Example 8 | 60% | 40% | 50 | 51 | 8 | ND |

Initial attempts to synthesize particles using higher percentages of octylamine (70-100%) as the stabilizer resulted in the formation of particles that were too large, as indicated by the $Z_{ave}$ shown in Examples 3 to 5 of Table 1 and therefore was not considered successful. Mixtures of 50-60% dodecylamine and 40-50% octylamine gave particles with acceptable particle size, as shown in Examples 6-8 of Table 1. Inks were formulated using some of the silver nanoparticles, as will be described in the examples below.

Comparative Example 9A: Preparation of Silver Concentrate (Control)

Silver nanoparticles (250.57 g), prepared as outlined in Example 2 of US2010/0240758A1 were added to a tared stainless steel jacketed beaker. Bicyclohexane (94.50 g) was added and the solvent was stirred with a spatula. The beaker was secured with clamps in a bath set to 26° C. A sawtooth agitator was lowered into the beaker and set at 400 RPM. A nitrogen septum needle was lowered into the beaker, 1 cm from bottom. The mixture was agitated for 10 minutes and then agitation was stopped. Big chunks of silver particles in the mixture were broken with a spatula. Agitation was continued for a total of 4 hours to give silver concentrate with the following properties: Ash (60.55%), $Z_{ave}$ (19.4 nm) and D[1,0] 7.4 nm. The concentrate was dispensed into two 250 mL amber glass bottles and purged with argon. The bottles were sealed with white tape and stored in the fridge.

Comparative Example 9B: Preparation Silver Nanoparticle Ink (Control)

Silver nanoparticle concentrate of control Example 9A (109.65 g) was transferred to a pre-weighted 120 mL amber bottle and weighted again. Bicyclohexane (10.16 g) and Phenylcyclohexane (30.01 g) were added. The mixture was blanketed with argon, sealed with 3M tape, labeled and placed on a Movil Rod overnight (about 18 hours). The resulting ink was filtered with 1 μm Pall Acrodisc glass fiber syringe filter, transferred to a pre-weighted amber glass bottle and labeled as the final ink. The bottle was purged with Argon, sealed with white 3M tape and store in a fridge. Table 2 below shows the ink formulation and resulting ink properties.

Example 10A: Preparation of Silver Concentrate

To a 25 mL round bottom flask, fitted with a magnetic stir bar was added of silver nanoparticles of Example 4 (7.4 g) and the flask was immersed in a water bath and the temperature was maintained at 8° C. by adding ice. T Bicyclohexane (2.0 g) was added and argon was purged deep into the mixture using a long needle. The mixture was stirred (700 rpm) at 8° C. for 1.5 hours and at 23° C. for 6 hours to give silver concentrate with the following properties: Ash (69.38%). The concentrate was transferred to a 30 mL brown bottle, flushed with argon and stored in a fridge.

Example 10B: Preparation of Silver Nanoparticle Ink

Silver nanoparticle concentrate of Example 10A (6.80 g) was transferred to a pre-weighted 30 mL amber bottle and weighed again. Added bicyclohexane (3.58 g) and phenylcyclohexyl (2.14 g) to the concentrate. The mixture was blanketed with argon, sealed with 3M tape, labeled and placed on orbital mixer for 2 hours followed by rolling on a Movil for 22 hours. Resulting ink was filtered through a 1 μm Pall Acrodisc glass fiber syringe filter and transferred to a pre-weighed amber glass bottle and labeled as the final ink, purged with Argon, sealed with white 3M tape and stored in fridge. Table 2 below shows the ink formulation and resulting ink properties.

Example 11A: Preparation of Silver Concentrate

A procedure similar to that of Example 10A was followed except that the silver nanoparticles of Example 5 were used to make related silver concentrate. Table 2 below shows the ink formulation and resulting ink properties.

Example 11B: Preparation of Silver Nanoparticle Ink

A procedure similar to that of Example 10B was followed except that silver concentrate of Example 11A was used to make a silver ink. Table 2 below shows the ink formulation and resulting ink properties.

Example 12A: Preparation of Silver Concentrate

A procedure similar to that of Example 10A was followed except that silver nanoparticle of Example 6 were used to make a silver concentrate.

Example 12B: Preparation of Silver Nanoparticle Ink

A procedure similar to that of Example 10B was followed except that silver concentrate of Example 12A was used to make a silver ink. Table 2 below shows the ink formulation and resulting ink properties.

Example 13A: Preparation of Silver Concentrate

A procedure similar to that of Example 10A was followed except that silver nanoparticle of Example 8 were used to make a silver concentrate.

Example 13B: Preparation of Silver Nanoparticle Ink

A procedure similar to that of Example 10B was followed except that silver concentrate of Example 13A was used to make a silver ink. Table 2 below shows the ink formulation and resulting ink properties.

TABLE 2

Silver Nanoparticle Ink Formulation and Properties

| Ink Component | Lot # | Control Ink Example 9B (xcm-nsIJ) weight (g) | Ink Example 10B weight (g) | Ink Example 11B weight (g) | Ink Example 12B weight (g) | Ink Example 13B weight (g) |
|---|---|---|---|---|---|---|
| Silver concentrate | Example 9A | 109.6 | | | | |
| | Example 10A | | 6.80 | | | |
| | Example 11A | | | 7.04 | | |
| | Example 12A | | | | 32.24 | |
| | Example 13A | | | | | 7.04 |
| Bicyclohexyane | ADDR001 (Solutia) | 10.39 | 3.58 | 3.29 | 14.46 | 1.76 |
| Phenylcyclohexane | 040215H17N (Oakwood Products) | 60.29 | 2.14 | 1.13 | 8.9 | 2.2 |
| Ink Properties | | | | | | |
| Viscosity (cps) | | | 5.86 | ND | ND | 5.26 | 5 |
| $Z_{ave}$ (nm) | | | 18.3 | ND | 10 | 12.4 | ND |

TABLE 2-continued

Silver Nanoparticle Ink Formulation and Properties

| Ink Component | Lot # | Control Ink Example 9B (xcm-nsIJ) weight (g) | Ink Example 10B weight (g) | Ink Example 11B weight (g) | Ink Example 12B weight (g) | Ink Example 13B weight (g) |
|---|---|---|---|---|---|---|
| D[1,0] (nm) | | 7.3 | ND | 7.2 | 7.6 | ND |

The inks of Table 2 were jetted using a Dimatix inkjet printer onto glass substrates. The resulting films were annealed at different temperatures as shown in Table 3 below. Conductivity of the annealed films was determined using a Keithley 4200A-CSC to measure resistance and a Dektak stylus profile to measure film thickness. The nanoparticle ink of the present disclosure (e.g., inks of Examples 12B and 13B) gave highly conductive films at lower temperatures compared to the control ink of Example 9B, indicating that the use of a combination of octylamine and dodecylamine as a stabilizer significantly reduced the annealing temperature.

TABLE 3

Silver Nanoparticle Ink Conductivities at Different annealing Temperatures and Times

| | Conductivity (S/cm) | | |
|---|---|---|---|
| Ink ID | 60° C./10 min | 60° C./30 min | 80° C./30 min |
| Ink of Example 9B with dodecylamine alone (Control) | Not Conductive | Not Conductive | 60000 |
| Ink of Example 10B | 0.2 | 0.5 | 60300 |
| Ink of Example 11B | 5940 | 15800 | 67900 |
| Ink of Example 12B | 47900 | 82100 | 135000 |
| Ink of Example 13B | 1.1 | 60000 | 92000 |

As shown by the results above, silver nanoparticles were effectively stabilized using a mixture of octylamine and dodecylamine binders. The lower boiling point of octylamine resulted in a particle with a lower annealing temperature than a particle with 100% dodecylamine stabilizer. The particles had a very small particle size. The inkjet inks formulated from the particles of this invention were able to be annealed at very low temperatures (e.g., 60° C.) in a short time (e.g., 10-30 minutes) to give highly conductive traces (e.g., >10,000 s/cm). This will enable the printing of conductive traces on many substrates that are sensitive to high temperatures, such as plastic films and polymeric objects, making it possible to create smart components for many applications. Similar results are expected for other inks, such as pneumatic aerosol inks, ultrasonic aerosol inks, flexographic inks, gravure inks if the same silver nanoparticles stabilized using a mixture of octylamine and dodecylamine binders are employed.

To the extent that the terms "containing," "including," "includes," "having," "has," "with," or variants thereof are used in either the detailed description and the claims, such terms are intended to be inclusive in a manner similar to the term "comprising."

Further, in the discussion and claims herein, the term "about" indicates that the values listed may be somewhat altered, as long as the alteration does not result in nonconformance of the process or structure to the illustrated embodiment.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

It will be appreciated that variants of the above-disclosed and other features and functions, or alternatives thereof, may be combined into many other different systems or applications. Various presently unforeseen or unanticipated alternative, modifications, variations or improvements therein may be subsequently made by those skilled in the art which are also intended to be encompassed by the following claims.

What is claimed is:

1. A nanoparticle composition comprising:
    a plurality of stabilized metal-containing nanoparticles comprising silver and/or a silver alloy composite,
    wherein the stabilized metal-containing nanoparticles are prepared by a method comprising reacting a silver compound with a reducing agent comprising a hydrazine compound by incrementally adding the silver compound to a first mixture comprising the reducing agent, a stabilizer and a solvent, the stabilizer comprising a mixture of a first organoamine and a second organoamine, an alkyl moiety of the first organoamine having a longer carbon chain length than an alkyl moiety of the second organoamine, wherein the first organoamine is dodecylamine and the second organoamine is octylamine, the amount of the octylamine ranging from about 40 mole % to about 60 mole % and the amount of the dodecylamine ranging from about 60 mole % to about 40 mole %, based on a total molar amount of organoamine added as the stabilizer.

2. The nanoparticle composition of claim 1, wherein the silver compound is added to the first mixture as a dissolved component of a metal-containing solution or as a powder form.

3. The nanoparticle composition of claim 1, wherein the stabilized metal-containing nanoparticle further comprises a metal selected from the group consisting of gold, platinum, palladium, copper, cobalt, chromium, nickel and mixtures of two or more thereof.

4. The nanoparticle composition of claim 1, wherein the stabilized metal-containing nanoparticles have the property of forming a metal framework with a conductivity of at least 10,000 S/cm when annealed at 60° C. for 30 minutes.

5. A process for preparing stabilized metal-containing nanoparticles comprising silver and/or a silver alloy composite comprising:
reacting a silver compound and/or a silver complex with a reducing agent comprising a hydrazine compound at a temperature ranging from about 20° C. to about 60° C.,
wherein the reaction is carried out by incrementally adding the silver compound and/or the silver complex to a mixture comprising the reducing agent, a stabilizer and a solvent, the stabilizer comprising a mixture of a first organoamine and a second organoamine, an alkyl moiety of the first organoamine having a longer carbon chain length than an alkyl moiety of the second organoamine, wherein the first organoamine is dodecylamine and the second organoamine is octylamine, the amount of the octylamine ranging from about 40 mole % to about 60 mole % and the amount of the dodecylamine ranging from about 60 mole % to about 40 mole %, based on a total molar amount of organoamine added as the stabilizer.

6. The process of claim 5, wherein the stabilized metal-containing nanoparticles possess an annealing point of about 60° C., at which temperature the stabilized metal-containing nanoparticles form a metal framework with a conductivity of at least 10,000 S/cm.

7. The process of claim 5, wherein the silver compound is added to the first mixture as a dissolved component of a metal-containing solution or as a powder form.

8. The process of claim 5, wherein the stabilized metal-containing nanoparticle further comprises a metal selected from the group consisting of gold, platinum, palladium, copper, cobalt, chromium, nickel and mixtures of two or more thereof.

9. The process of claim 5, wherein the stabilized metal-containing nanoparticles have the property of forming a metal framework with a conductivity of at least 10,000 S/cm when annealed at 60° C. for 30 minutes.

10. A conductive ink composition comprising:
a plurality of stabilized metal-containing nanoparticles comprising silver and/or a silver alloy composite and at least one ink vehicle,
wherein the plurality of stabilized metal-containing nanoparticles are dispersed in the ink vehicle and wherein the stabilized metal-containing nanoparticles are prepared by a first method comprising reacting a silver compound with a reducing agent comprising a hydrazine compound by incrementally adding the silver compound to a first mixture comprising the reducing agent, a stabilizer and a solvent, the stabilizer comprising a mixture of a first organoamine and a second organoamine, an alkyl moiety of the first organoamine having a longer carbon chain length than the alkyl moiety of the second organoamine, wherein the first organoamine is dodecylamine and the second organoamine is octylamine, the amount of the octylamine ranging from about 40 mole % to about 60 mole % and the amount of the dodecylamine ranging from about 60 mole % to about 40 mole %, based on a total molar amount of organoamine added as the stabilizer.

11. The conductive ink composition of claim 10, wherein the silver compound is added to the first mixture as a dissolved component of a metal-containing solution or as a powder form.

12. The conductive ink composition of claim 10, wherein the stabilized metal-containing nanoparticle further comprises a metal selected from the group consisting of gold, platinum, palladium, copper, cobalt, chromium, nickel and mixtures of two or more thereof.

13. The conductive ink composition of claim 10, wherein the stabilized metal-containing nanoparticles have the property of forming a metal framework with a conductivity of at least 10,000 S/cm when annealed at 60° C. for 30 minutes.

\* \* \* \* \*